Dec. 21, 1965          J. D. HILL          3,224,734
PNEUMATIC SELF-PROPELLED APPARATUS
Filed Oct. 7, 1963          3 Sheets-Sheet 1
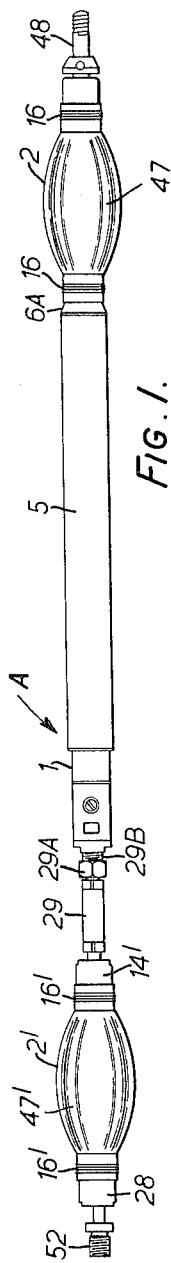
FIG. 1.
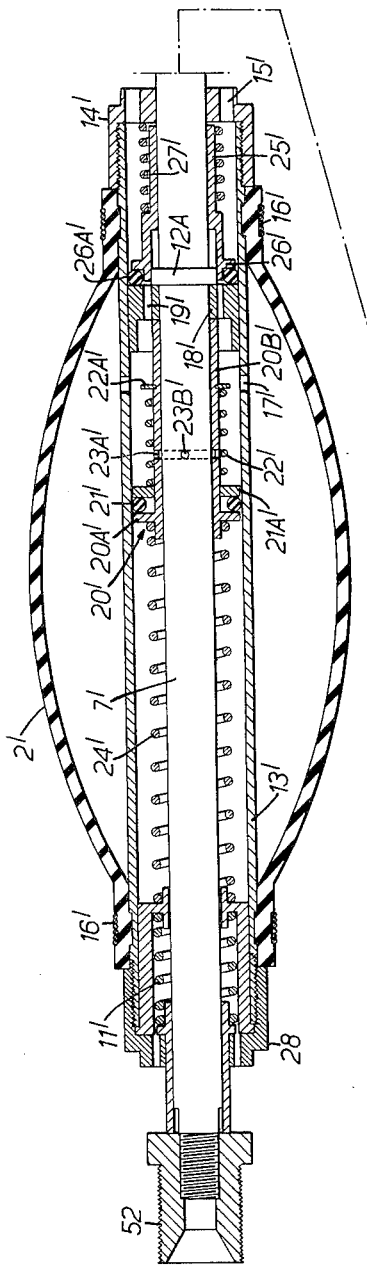
FIG. 2.
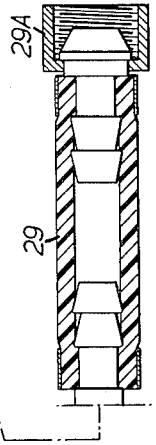
INVENTOR
JAMES D. HILL
BY
ATTORNEY Dec. 21, 1965  J. D. HILL  3,224,734
PNEUMATIC SELF-PROPELLED APPARATUS
Filed Oct. 7, 1963  3 Sheets-Sheet 2

INVENTOR
JAMES D. HILL
BY
Hall & Houghton
ATTORNEY

Dec. 21, 1965   J. D. HILL   3,224,734
PNEUMATIC SELF-PROPELLED APPARATUS
Filed Oct. 7, 1963   3 Sheets-Sheet 3

INVENTOR
JAMES D HILL
BY
Hall + Knighton
ATTORNEY

３,224,734
PNEUMATIC SELF-PROPELLED APPARATUS
James Douglass Hill, Caterham, Surrey, England, assignor to Her Majesty's Postmaster General, London, England
Filed Oct. 7, 1963, Ser. No. 314,379
Claims priority, application Great Britain, Oct. 10, 1962, 38,454/62
17 Claims. (Cl. 254—134.6)

This invention relates to apparatus for self-propulsion through a duct or the like and in particular which may be used for drawing in a rope or flexible wire subsequently employed for drawing a cable into the duct.

According to the present invention apparatus for self-propulsion along a duct or the like has an elongated pneumatically operable telescopic body portion supported at its leading and trailing ends by respective inflatable bag grips, a pneumatic pressure distributor valve movable between first and second operative positions for distributing pneumatic pressure alternately to extend the body portion with the trailing end bag grip inflated to a predetermined pressure sufficient to firmly grip the duct wall and with the leading end bag grip sufficiently deflated to permit sliding movement thereof along the duct and to contract the body portion with the leading end bag grip inflated to a predetermined pressure sufficient to firmly grip the duct wall and with the trailing end bag grip sufficiently deflated to permit sliding movement thereof along the duct, and resilient means responsive to the said extension and contraction of the body portion for effecting the said movement of the distributor valve between the first and second operative positions.

The telescopic body portion may comprise a cylinder member having a piston member slidable therein, one of the bag grips being connected to the cylinder member for movement therewith and the other bag grip being connected to the piston member for movement therewith.

The deflation of the bag grips is controlled by respective valves, one operable by and during extension of the body portion to allow deflation of the first bag grip and the other valve operable by and during contraction of the body portion to allow deflation of the second bag grip; preferably the control valves are operated such that only partial deflation of the bag grips occurs, enabling relatively fast operation of the apparatus. The body portion may be connected to the respective bag grips by means each including a lost motion coupling device for maintenance of the respective bag grips in the partly deflated condition during the movement thereof.

The apparatus may incorporate for each bag grip a regulator valve for determining the pressure to which that bag grip is inflated, which pressure is independent of the pressure of the pneumatic source which operates the apparatus.

The pressure distributor valve preferably is a spool valve slidable within a chamber formed in the body portion and the spool valve may be operated between its two operative positions by spring devices which are compressed alternately by extension and contraction of the body portion. This arrangement permits re-starting of the apparatus, should it stall during operation, at any point in the working cycle.

The bag grips may be made of a flexible material which is non-stretchable at the pressures to which the bag grips are subjected during operation of the apparatus. Suitable materials are polyvinylchloride and oil resistant synthetic rubber. Advantageously, the bag grips have peripheral formations, for example grooves extending longitudinally with respect to the body portion, which permit air trapped between the bag grips to escape when the grips are moved towards each other during contraction of the body portion.

By way of example, self-propulsion apparatus embodying the invention will be described in greater detail with reference to the accompanying drawings, of which:

FIG. 1 is an elevational view of a duct traversing device,

FIG. 2 is a longitudinal section of part of FIG. 1,

Figure 3:
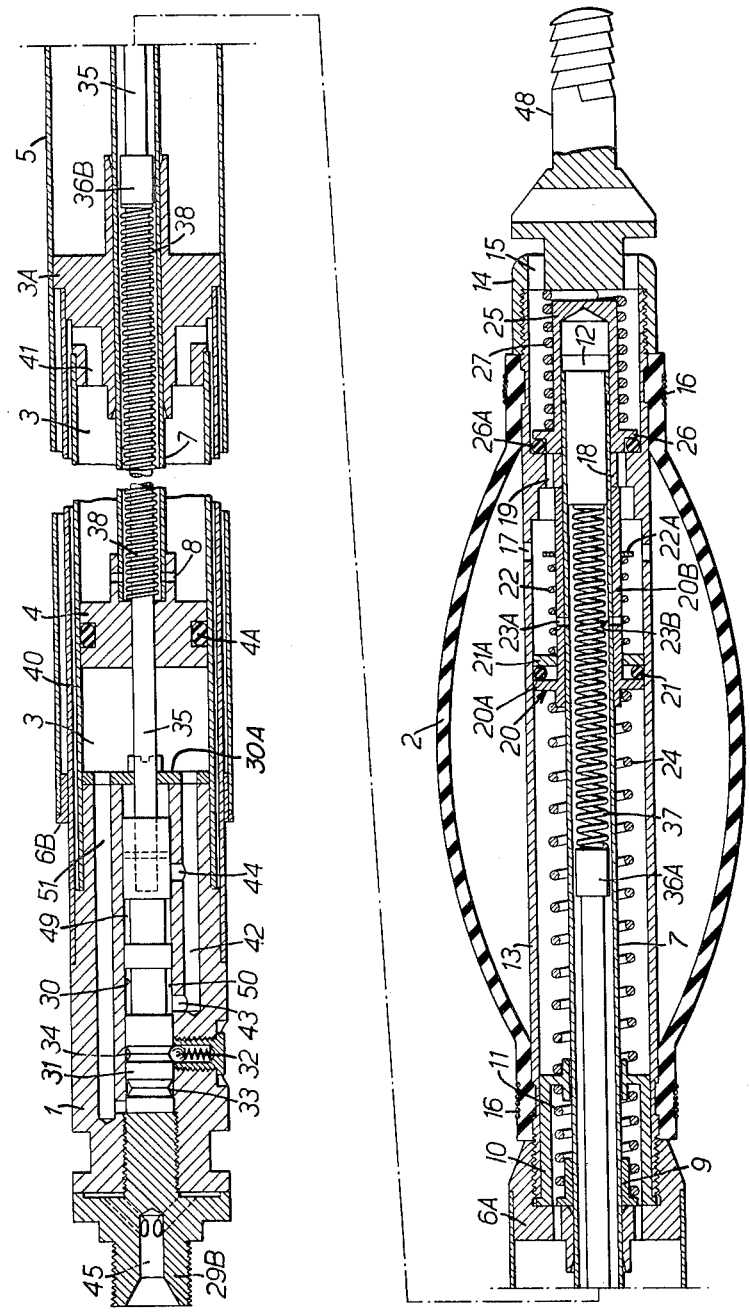
FIG. 3 is a longitudinal section of the remainder of FIG. 1.

The drawings show a duct traversing device having a body portion A supported forwardly and rearwardly by inflatable bag grips 2 and 2' respectively. The body portion includes a member 1 which closes one end of a cylinder member 3 whose other end is closed by a cap 3A. The cylinder member 3 accommodates a piston 4 capable of sliding movement relative to the members 1 and 3. The piston 4 has an O-ring seal 4A. Surrounding the cylinder member 3 is a hollow cylindrical cover tube 5, having an end cap 6A at its forward end and an end bush 6B at its rearward end, and slidable along the cylinder member 3. A tube 7 is secured to, and extends forwardly of the piston 4, passing slidably through bores in the end caps 3A and 6A, projecting beyond the end cap 6A. The interior of the tube 7 communicates with the cylinder 3 by means of apertures 8 in the walls of the tube 7 and of the axial flange of the piston 4. In a recess on the forward side of the cap 6A, a flanged collar 9 is fixed to the tube 7 and is located within a cup-shaped member 10 secured to the cap 6A of the cover tube 5. A spring 11 surrounds the tube 7 within the cup-shaped member 10, bearing against the closed end thereof and against the flange of the collar 9. At its forward end, the tube 7 is closed by a tightly fitting plug 12.

The projecting portion of the tube 7 is surrounded by a tubular casing 13 which is secured to the end cap 6A of the cover tube 5, the forward end of the casing 13 having a cap 14 in which are formed apertures 15. The bag grip 2 surrounds the casing 13 and is secured to it by waxed twine bindings 16 which permit replacement of the bag 2. The bindings 16 overlie grooves in the casing 13 to facilitate secure attachment of the bag. Apertures 17 in the wall of the casing 13 provide communication between the interiors of the bag 2 and of the casing 13.

Near its end plug 12, the tube 7 passes slidably through the bore of an annular seating member 18 which depends from the inner wall of the casing 13 and which is located forwardly of the apertures 17. The member 18 has apertures 19. On the side of the member 18 nearer the end cap 6A there is located within the casing 13 a regulator valve 20 having an annular head 20A, located rearwardly of apertures 17, and a hollow stem 20B slidable over the tube 7 with its forward movement, relative to the casing 13, determined by the seating member 18. An O-ring seal 21 is located on the forward side of the flange 20A, being retained by a washer 21A against which bears a spring 22 held by a circlip 22A on the stem 20B. The stem 20B has apertures 23A which can register with apertures 23B formed in the tube 7. A regulator spring 24, surrounding the tube 7, bears against the cup 10 and the valve flange 20A.

Located forwardly of the seating member 18 is a cup-shaped escape valve 25 enclosing the forward end of the tube 7 and having, at its open end, an annular flange 26 provided with an O-ring seal 26A which seats against the forward side of member 18 radially outwardly of the apertures 19. A seating spring 27 bears against the flange 26 and the end cap 14.

The mounting of the rear bag 2' and its associated components are similar to those of the forward bag 2 and the components of the rear bag arrangement which are the equivalent of those of the forward bag 2 have corresponding indexed references. In the rear bag arrangement however, the escape valve 25' and the end cap 14' have end bores through which the tube 7' extends and in place of an end plug 12 the tube 7' has, located slightly forwardly of the seating member 18', a collar 12A. At its rear end, the casing 13' is closed by a cap 28 through which the tube 7' extends. The projecting forward end of the tube 7' is attached by a short length of hose 29 to a screw-threaded female coupling member 29A which is screwed on to a male coupling member 29B attached to the rearward end of the member 1.

A valve chamber 30 is formed in the member 1, rearwardly of the cylinder 3, and contains a distributor valve 31 capable of assuming either one of two operative positions, respectively defined by the engagement of a spring loaded ball 32 with peripheral grooves 33 and 34 formed in the valve member 31. The valve member 31 has a stem 35 which extends forwardly thereof through the piston 4 and terminates in a head 36A forwardly of the end wall 6A of the member 5. The stem 35 also has a collar 36B intermediate its two ends. A compression spring 37 is located within the tube 7 between the head 36A and the plug 12 and a further compression spring 38 is located between the collar 36B and the piston 4.

The member 1 has a tubular duct 39 extending from the valve cylinder 30 and opening into an annular duct 40 which communicates with the forward end of the cylinder 3 through a duct 41 in the end cap 3A. A duct 42 connects the rear end of the cylinder 3 with the valve chamber 30 at spaced locations 43 and 44, one on either side of the connection of the duct 39 with the valve chamber 30. An inlet duct 45 in the coupling member 29B communicates with the valve chamber 30 via ducts 46 and 47 whilst an exhaust duct 48 is formed in the member 1 and communicates with the valve chamber 30 forwardly of the inlet duct 47. The exhaust duct may be fitted with a non-return valve to prevent entry of water if the air supply should fail when the device is under water. The valve member 31 has circumferential exhaust and inlet recesses 49 and 50 respectively. A passage 51 in the member 1 connects the rear end of the cylinder 3 to the rear end of the valve chamber 30 for pressure equalisation of the valve member 31 during operation, the forward end of valve chamber 30 being connected to the rear end of cylinder 3 by leakage around the stem 35 which is a loose fit in the closure member 30A.

For operation of the device, a compressed air supply can be connected, preferably via a filter, by a hose receiving nozzle 52 connected to the rear end of the tube 7'. With the distributor valve 31 in the position shown in FIGS. 3 and 4, compressed air is fed from the nozzle 52 via the tube 7', ducts 45, 46, recess 50 and ducts 43 and 42 to the rear end of the cylinder 3 and moves the piston 4 forwards relative to the body members 1 and 3, i.e. the body portion A extends. During this movement, air displaced from the forward end of the cylinder 3 escapes via ducts 41, 40 and 39, recess 49 and duct 48. With the distributor valve 31 in the other position, i.e. with ball 32 engaging groove 33, compressed air from the nozzle 52 is fed via tube 7', ducts 45, 46, recess 50 and ducts 39, 40 and 41 to the forward end of the cylinder 3 and moves the piston 4 rearwards relative to the body member 1, i.e. the body portion A contracts. During this movement, air displaced from the rear end of cylinder 3 escapes via ducts 42 and 44, recess 49 and duct 48.

In operation, the device is placed in a duct to be traversed and the nozzle 52 is connected by a flexible hose and via a filter to a compressed air source. With the distributor valve in the position opposite that shown in FIGS. 3 and 4, compressed air is fed through the tube 7' via the distributor valve 31 to the forward end of the cylinder 3 and then through the apertures 8 and 23B in the tube 7 and apertures 23A and 17 in the regulator valve 20 and casing 13 respectively and commences to inflate the forward bag grip 2. The regulator valve 20 moves rearwardly to cut off the air supply to the bag 2 when the pressure inside the bag is sufficient to overcome the spring 24. The bag 2 thus is inflated to a predetermined pressure in which condition it firmly grips the duct wall.

Figure 4:
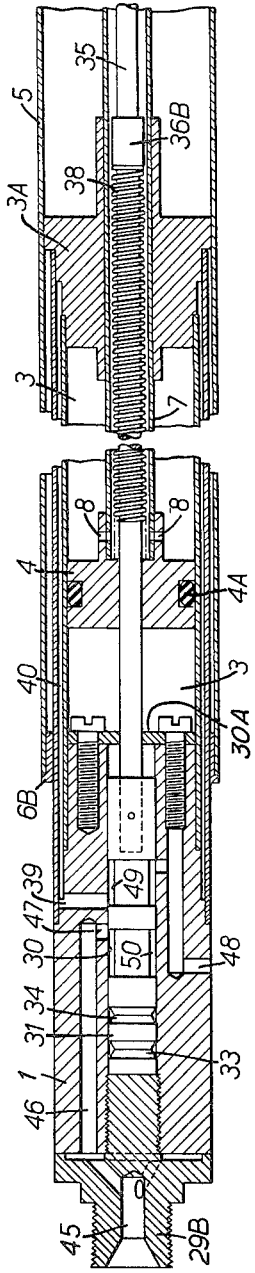
FIG. 4 is a transverse longitudinal section of part of FIG. 3.

FIGS. 3 and 4 show the piston 4 at the end of a rearward working stroke relative to the body members 1 and 3, at the beginning of which stroke the rear bag 2' had been inflated and during which forward movement of the body members 1 and 3, relative to the piston 4, had caused partial deflation of the bag 2' and forward movement thereof together with the body members 1 and 3 in a manner to be described later.

Forward movement of the body members 1 and 3 causes the head 36A of the valve stem 35 to compress spring 37. At the end of the rearward stroke of the piston 4, the spring 37 is sufficiently compressed to overcome the resistance of the spring loaded ball 32 and the distributor valve 31 snaps into its rearwards operative position, shown in FIGS. 3 and 4, in which the ball 32 engages the groove 34. Compressed air then is admitted in to the cylinder 3 at its rear end and the piston 4 is moved forwards relative to the body members 1 and 3, carrying with it the tube 7 and collar 9 causing compression of the restoring spring 11. The tube 7 moves forward freely for a short distance, for a purpose to be described later, before the end plug 12 strikes the end of the escape valve 25, moving it against the spring 27 in a forward direction, relative to the casing 13, away from the seating 18. Air then escapes from the bag 2 via apertures 19 and 15 so that the bag 2 becomes partially deflated and moves forwards along the duct together with the tube 7 and casing 13. As soon as this forward movement commences, the seating 18 re-closes on seal 26A and the flange 26 prevents further loss of air. The reduction of pressure inside the bag 2 causes the regulator valve 20 to be moved forward again by the spring 24, but the initial forward movement of the tube 7 relative to the casing 13, as previously described, ensures that the bag pressure remains steady at the partially deflated value. When the piston 4, and tube 7, reach the end of their forward stroke, the restoring spring 11 moves the still slightly deflated bag 2 further forwards until the relative position of the components of the regulator valve 20 and tube 7 is restored to that shown in FIG. 3. This permits re-inflation of the forward bag grip 2 to the predetermined pressure (which occurs quickly since it is arranged that little air is lost during the deflation of the bag 2) and it again firmly grips the duct wall.

During the forwards movement of the piston 4, the spring 38 has been compressed and now acts to snap the distributor valve 31 back into the position opposite that shown in FIGS. 3 and 4. Compressed air is now admitted into the forward end of the cylinder 3 and the piston 4 is urged in a rearwards direction but cannot move since the forward bag grip 2, to which the piston is connected, is fully inflated. Hence, the body members 1 and 3 are moved forwardly pulling with them the flexible supply hose attached to the nozzle 52 and also the tube 7' and collar 12A. The collar 12A moves forwards freely for a short distance before striking the escape valve 25' and unseating it, against the action of spring 27', to permit air to escape via apertures 19' and 15' to partially deflate the rear bag grip 2'. The partial deflation of the bag 2' permits it to move forwards together with the tube 7'. At the end of the forward stroke of the tube 7' and the body members 1 and 3, the restoring spring 11' continues the forward movement of the bag 2' until the relative position of the components of the regulator valve 20' and the tube 7' is restored to the position shown in FIG. 2 permitting re-inflation of the grip 2' so that it again grips the duct wall. During the forwards movement of the body members 1 and 3, the spring 37 has been compressed and now snaps the distributor valve 31 into the rearwards operative position shown in FIGS. 3 and 4. Compressed air then is again admitted to the rear end of the cylinder 3, piston 4 is moved forwards as previously described and the cycle of actions described above is repeated.

The device thus is propelled forwardly through the duct by partial deflation of the forward bag grip and movement forward of the tube 7 and piston 4 with the rear bag fully inflated (i.e. extension of the body portion A), alternating with partial deflation of the rear bag 2' and movement forward of the tube 7' and body members 1 and 3 with the forward bag 2 fully inflated (i.e. contraction of the body portion A).

In both front and rear bags, the escape valves 25, 25' function also as safety valves, their springs 27, 27' being designed to allow the valves to open at a predetermined pressure, somewhat higher than the fully inflated pressure of the bags 2 and 2', if through some failure of the regulator valves 20, 20' the pressure inside the bags should rise too much.

Figure 5:
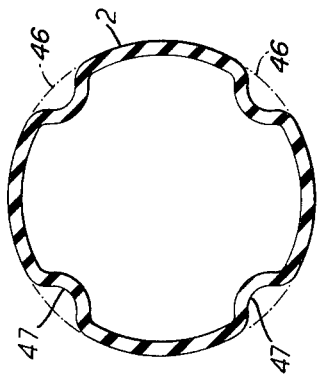
FIG. 5 is a cross-sectional view of the bag grips shown in FIG. 1.

FIG. 5 shows a cross-section of a bag grip showing the grip in position in a circular duct indicated by the broken line 46. It will be seen that grooves 47 are provided in the periphery of the bag and which facilitate escape of air trapped between the front and rear bags when the two bags are drawn towards each other. The grooves 47 serve also to permit the bag grips to flatten more easily when negotiating obstructions in the duct.

The bags 2 and 2' are made of a material which is flexible but substantially non-stretching at the pressures used. Suitable materials include polyvinylchloride and oil resistant synthetic rubber.

The device shown has, at its leading end, adjacent to the air-holes 15, a male coupling member 48 but can instead be fitted with a female coupling member having spring loaded jaws.

The device may be used to negotiate the length of a duct from one end to the other, drawing, for example, a length of rope or flexible wire along with it and by means of which a cable can subsequently be laid in the duct. In relatively long ducts, however, it may be more convenient to operate two devices of the type described with reference to the drawings to travel towards each other from opposite ends of the duct and to join together when they meet. To this end, the leading end of one of the devices so used may be fitted with a male coupling device, such a device 48 being shown in FIGS. 1 and 3, whilst the other device may be fitted with a co-operating female coupling device having spring loaded jaws. By this latter method ducts up to 700 yards long have been traversed.

The device described above is suitable for use in empty ducts or in ducts which already have cable laid in them and is capable of adapting itself to varying cross-sections along the length of a duct. The device is capable of satisfactory operation under dry conditions within a duct and also when the duct is flooded.

The particular form of distributor valve adopted permits the device to be operable at varying speeds and to be restarted, whilst in the duct, at any point in the working cycle. Further, the distributor valve precludes stalling of the device.

The bag grips operate at a convenient pressure, set by the regulator valve springs, which is independent of the pressure source connected to the inlet. A bag pressure of about 5 p.s.i. has been found convenient and typically a supply source operating at 100–150 p.s.i. may be used. The arrangement of the escape valve assemblies to permit only partial deflation of the bags is a most useful feature (although they may be arranged, if desired, to permit full deflation), allowing a relatively high speed of operation of the device, and together with the relatively low bag pressure, when inflated, permits use of a relatively small air compressor connected to the inlet nozzle by a small diameter lightweight hose.

One machine which has been constructed has been operated at speeds of about 25 yards per minute and has been satisfactorily operated in a duct having empty sections of a diameter of 4 inches and having a minimum inside dimension of 1½ inches in sections accommodating cables.

I claim:

1. Apparatus for self-propulsion along a duct or the like, having an elongated pneumatically operable telescopic body portion, first and second inflatable bag grips supporting the body portion at its leading and trailing ends respectively, a fluid inlet for connecting a pneumatic pressure source to the apparatus, means permitting inflation of the first and second bag grips sufficiently for a bag grip so inflated to firmly grip the duct wall preventing movement of that bag grip along the duct, the body portion including pneumatic pressure distributor valve means movable between first and second operative positions for distributing pneumatic pressure from the fluid inlet alternately to extend the body portion with the trailing end bag grip inflated to firmly grip the duct wall and with the leading end bag grip sufficiently deflated to permit sliding movement thereof along the duct, and to contract the body portion with the leading end bag grip inflated to firmly grip the duct wall and with the trailing end bag grip sufficiently deflated to permit sliding movement thereof along the duct, a first control valve operable by and during the said extension of the body portion to permit the said deflation of the first bag grip, a second control valve operable by and during the said contraction of the body portion to permit the said deflation of the second bag grip, and resilient means coupling the body portion and the distributor valve means, said resilient coupling means being responsive to the said extension and contraction of the body portion to effect the said movement of the distributor valve between said first and second operative positions.

2. Apparatus according to claim 1, in which the said telescopic body portion comprises a cylinder member having a piston member slidable therein, means connecting one of the said bag grips to the cylinder member and means connecting the other one of the said bag grips to the piston member.

3. Apparatus according to claim 1, including first means permitting operation of the first control valve during the said extension of the body portion only until the said first bag grip commences to move, and second means permitting operation of the second control valve during the said contraction of the body portion only until the said second bag grip commences to move, thereby permitting only partial deflation of the respective said bag grips.

4. Apparatus according to claim 3, in which the body portion is connected to the respective said bag grips by means each including a lost motion coupling for maintenance of the respective bag grips in the partially deflated condition during the said movement thereof.

5. Apparatus according to claim 1, including for each bag grip a regulator valve for determining the pressure to which that bag grip is inflated at a pressure independent of the pneumatic pressure from said fluid inlet.

6. Apparatus according to claim 1, in which the said distributor valve means comprises a spool valve slidable within a chamber formed in the said body portion.

7. Apparatus for self-propulsion along a duct or the like, having first and second pneumatically operable telescopic members together defining a body portion, first and second inflatable bag grips, means connecting the first and second bag grips to the respective first and second telescopic members to support the body portion between the said bag grips, a pneumatic pressure distributor valve movable between first and second operative positions for distributing pneumatic pressure to cause relative movement of the first and second telescopic members alternatively to extend and contract the body portion, means permitting inflation of the first and second bag grips sufficiently for a bag grip so inflated to firmly grip the duct wall preventing movement of that bag grip along the duct, and first and second control valves for permitting deflation of the respective first and second bag grips, the first and second control valves being operable by the said movement of the first and second telescopic members respectively, the distributor valve when in the said first operative position causing said extension of the body portion by movement of the first telescopic member with the second bag grip inflated at a predetermined pressure whereby it firmly grips the duct wall preventing movement of the second telescopic member along the duct, the movement of the first telescopic member causing operation of the said first control valve to permit partial deflation of the first bag grip to allow movement thereof together with the first telescopic member along the duct, the distributor valve when in the said second operative position causing said contraction of the body portion by movement of the second telescopic member with the first bag grip inflated at a predetermined pressure whereby it firmly grips the duct wall preventing movement of the first telescopic member along the duct, the movement of the second telescopic member causing operation of the said second control valve to permit partial deflation of the second bag grip to allow movement thereof together with the second telescopic member along the duct, and resilient means responsive to the said extension and contraction of the body portion for effecting movement of the said distributor valve alternately between the first and second operative positions thereof.

8. Apparatus according to claim 7, in which the means connecting the first bag grip to the first telescopic member and the means connecting the second bag grip to the second telescopic member each includes a lost motion coupling device for maintenance of the respective first and second bag grips in the partially deflated condition during the said movement thereof.

9. Apparatus according to claim 7, having, for each bag grip, a first tube and a second tube, means supporting the first tubes in surrounding relationship about the respective second tubes, and means mounting the first and second bag grips on and around the respective first tubes, and in which there is for each of the said bag grips a regulator valve for permitting inflation of the bag grip via first and second tubes on which it is mounted, and in which the first and second control valves permit the said partial deflation of the first and second bag grips via the respective said first tubes.

10. Apparatus according to claim 9, in which the bag grips each are made of a flexible material which is substantially non-stretching at the pressure to which the bags are inflated.

11. Apparatus according to claim 7, in which the bag grips each have peripheral formations which facilitate flow of fluid between the duct wall and the said bag grips when the latter are inflated to the said predetermined pressure.

12. Apparatus for self-propulsion along a duct or the like, having a cylinder member accommodating a piston member for relative sliding movement therebetween, the cylinder and piston members together defining a body portion, first and second inflatable bag grips supporting the body portion at either end thereof and connected for movement therewith respectively to the cylinder member and the piston member, an inlet for connection of a pneumatic pressure source to the apparatus, means permitting inflation of the first and second bag grips to a predetermined pressure sufficient for a bag grip so inflated to firmly grip the duct wall preventing movement of that bag grip along the duct, the body portion also including a spool valve movable between first and second operative positions for distributing pneumatic pressure from the said inlet, in the first operative position the spool valve connecting the inlet to the cylinder on one side of the piston and in the second position connecting the inlet to the cylinder on the opposite side of the piston for causing relative movement between the piston and cylinder members alternately to extend and contract the said body portion, a first control valve operable by the said extension of the body portion to permit deflation of the first bag grip sufficient to allow that bag grip to slide along the duct, a second control valve operable by the said contraction of the body portion to permit deflation of the second bag grip sufficient to allow that bag grip to slide along the duct, and resilient means responsive to the said extension and contraction of the body portion for moving the spool valve alternately between the first and second operative positions thereof, during the said extension of the body portion the second control valve being unoperated and the second bag grip inflated at the predetermined pressure preventing movement of the cylinder member whereby the piston member moves causing operation of the first control valve and the said deflation of the first bag grip and movement thereof together with the piston member, and during the said contraction of the body portion the first control valve being unoperated and the first bag grip inflated at the predetermined pressure preventing movement of the piston member whereby the cylinder member moves causing operation of the second control valve and the said deflation of the second bag grip and movement thereof together with the cylinder member.

13. Apparatus according to claim 12, including first means permitting operation of the first control valve during the said extension of the body portion only until the first bag grip commences to move, and second means permitting operation of the second control valve during the said contraction of the body portion only until the second bag grip commences to move, thereby permitting only partial deflation of the respective bag grips.

14. Apparatus according to claim 13, in which the said connection between the cylinder member and the first bag grip and the said connection between the piston member and the second bag grip each includes a lost motion coupling for maintenance of the respective said bag grips in the partially deflated condition during the said movement thereof.

15. Apparatus according to claim 12, including for each of the said bag grips a regulator valve for determining the pressure to which that bag grip is inflated at a valve independent of the pneumatic pressure source.

16. Apparatus according to claim 12, in which the said first and second bag grips are made of a substantially non-elastic flexible material.

17. Apparatus for self-propulsion along a duct or the like having an elongated pneumatically operable extendable and contractible body portion, first and second inflated bag grips supporting the body portion at its leading and trailing ends respectively, the body portion including a pneumatic pressure distributor valve movable between first and second operative positions for distributing pneumatic operating pressure alternately to extend and contract the body portion, first and second pneumatic valve assemblies for controlling inflation and deflation of the respective first and second bag grips, means operatively coupling the first and second pneumatic valve assemblies to the body portion, during the said extension of the body portion the second control valve assembly maintaining the second bag grip inflated at a pressure independent of the said pneumatic operating pressure and sufficient to prevent movement of the second bag grip along the duct, the said extension of the body portion operating the first control valve assembly to permit the first bag grip to deflate only until the said first bag grip commences to move along the duct with the body portion, during the said contraction of the body portion the first control valve assembly maintaining the first bag grip inflated at a pressure independent of the said pneumatic operating pressure and sufficient to prevent movement of the first bag grip along the duct, the said contraction of the body portion operating the second control valve assembly to permit the second bag grip to deflate only until the said second bag grip commences to move with the body portion, and resilient means coupling the body portion and the distributor valve, said resilient coupling means being responsive to the said extension and contraction of the body portion to move the distributor valve alternately between the first and second operative positions thereof whereby to propel the apparatus along the duct.

References Cited by the Examiner
UNITED STATES PATENTS 2,518,330  8/1950  Jasper et al. _____ 15—104.05 X
2,855,934  10/1958  Daughaday _____ 254—134.6 X WILLIAM FELDMAN, *Primary Examiner.*

MILTON S. MEHR, *Examiner.*